No. 769,884. PATENTED SEPT. 13, 1904.
A. BAUMGART.
TORPEDO GRENADE.
APPLICATION FILED JAN. 27, 1904.
NO MODEL.
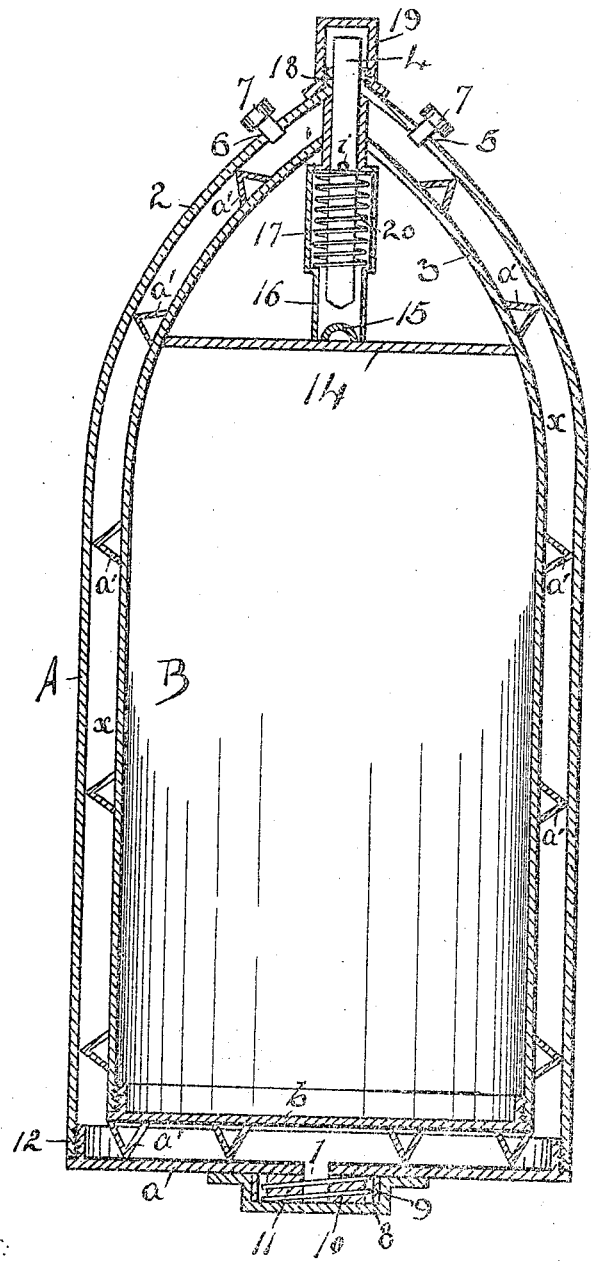
WITNESSES:
L. Worel
Meta Sands.
INVENTOR
August Baumgart
By Geo. W. Suss.
Attorney No. 769,884.

Patented September 13, 1904.

UNITED STATES PATENT OFFICE.

AUGUST BAUMGART, OF CORNLEA, NEBRASKA.

TORPEDO-GRENADE.

SPECIFICATION forming part of Letters Patent No. 769,884, dated September 13, 1904.

Application filed January 27, 1904. Serial No. 190,863. (No model.)

*To all whom it may concern:*

Be it known that I, AUGUST BAUMGART, residing at Cornlea, in the county of Platte and State of Nebraska, have invented certain useful Improvements in Torpedo-Grenades; and I do hereby declare that the following is a full, clear, and exact description of the invention, such as will enable others skilled in the art to which it appertains to make and use the same, reference being had to the accompanying drawings, which form a part of this specification.

This invention relates to a new and useful improvement in torpedo-grenades.

The aim of my invention is to provide a grenade which will be constructed so that an exceedingly high explosive may be used.

My invention comprises certain combinations, as will be set forth more particularly in the claim.

In the accompanying drawing I have shown a central sectional view of a grenade embodying my invention.

In carrying out the aim of my invention I provide a suitable shell or casing A, pointed at one end to form the breast 2, which is provided with the threaded neck 18, while the rear of the shell or casing is interiorly threaded, as at 12, to receive the cap $a$, which is provided with a perforation, as is shown in the drawing. This shell or casing A is made of any suitable size and in front is perforated with two perforations 5 and 6 at suitable points at the breast, which perforations are closed by means of the plugs 7. The rear cap $a$ is provided with the shoulder 9, adapted to receive the cap 8, while surrounding the opening 1 is a solid collar 11, and between this collar 11 and the shoulder 9 is held a coil-spring 10, which normally exerts a pressure against the cap 8.

Held within the shell or casing A is the explosive-containing receptacle B, preferably conforming to the shape of the shell or casing A, as shown in the drawing, and this explosive-holding receptacle is provided with a plurality of outwardly-extending V-shaped, preferably wire, stops $a'$, so that when the receptacle B is inserted within the shell or casing A an air-chamber $x$ is provided entirely surrounding the receptacle B, as is disclosed in the drawing. Positioned transversely within the forward end of the receptacle B is a bar 14, upon which bar is held a detonating-cap 15, this cap, as well as the bar 14, being intended to be entirely surrounded by the explosive—such as dynamite, for instance—within the receptacle B. Extending from this bar 14 is a tube 16, forming a housing which projects through the receptacle B and at its forward end rests adjacent the inner point of the shell or casing A, as shown in the drawing. Held within this housing 16, which is slightly enlarged centrally, as shown at 17, is a firing-pin 4, projecting beyond the housing 16 and through the neck 18, projecting beyond the outer shell or casing, as shown, and this projecting end of the firing-pin is protected by a stout cap 19, threading upon the collar 18, as shown. This firing-pin 4 is provided with a stop $i$, against which works a spring 20, normally forcing the firing-pin forward, so that the lower end thereof will be held away from the detonating-cap 15.

The rear cap 8 is secured to the outer shell or casing A by means of a soft solder adapted to melt at a thermal point considerably below the heat generated within the piece at the time the shell is discharged.

Now in the use of this shell or grenade the plugs 7 are removed before lowering the same or before the shell is inserted within the piece. At the moment of discharge the heat generated within the piece will be sufficient to melt the solder holding the cap 8, so that the spring 10 will promptly throw off this cap 8, uncovering the vent or exit opening 1, so that in its passage through space a current of air will pass through the shell between the casing and in the receptacle, finding an escape at 1. On coming in contact with an obstruction the forward cap 19 is crushed, forcing the pin 4 inward to discharge the detonating-cap 15 and igniting the explosive within the shell.

These shells or grenades may be made of suitable sizes and are also adapted to be dropped from above.

Having thus described my said invention, what I claim as new, and desire to secure by United States Letters Patent, is—

A shell or grenade, comprising an outer casing perforated near the forward end, a cap adapted to be displaced at the moment of leaving the piece to uncover a rear vent-opening, an interior explosive-containing receptacle positioned within said casing, said receptacle being smaller than said casing to provide a surrounding air-space, means to support said receptacle within said casing, a suitably-held detonating-cap within said receptacle, a spring-held firing-pin positioned adjacent to said detonating-cap, said firing-pin projecting beyond the forward end of both casings, and a cap protecting the forward end of said firing-pin, all arranged substantially as, and for the purpose set forth.

In testimony whereof I affix my signature in presence of two witnesses.

AUGUST BAUMGART.

Witnesses:
R. P. DRAKE,
HENRY GIETZEN.